United States Patent [19]

Akita et al.

[11] 4,382,503

[45] May 10, 1983

[54] WALKING BEAM

[75] Inventors: Shinji Akita, Yokohama; Minoru Morita, Kawasaki, both of Japan

[73] Assignee: Nippon Kokan Kabushiki Kaisha, Tokyo, Japan

[21] Appl. No.: 295,253

[22] Filed: Aug. 24, 1981

[30] Foreign Application Priority Data

Aug. 29, 1980 [JP] Japan ................................ 55-118434

[51] Int. Cl.³ ............................................. B65G 25/00
[52] U.S. Cl. .................................................... 198/774
[58] Field of Search ....................... 198/774, 775, 776; 74/773, 774, 776, 781 R, 789

[56] References Cited

U.S. PATENT DOCUMENTS 1,964,147  6/1934  Fisk ...................................... 198/776

Primary Examiner—Jeffrey V. Nase
Assistant Examiner—Dennis Williamson
Attorney, Agent, or Firm—Joseph W. Molasky & Assoc.

[57] ABSTRACT

Disclosed is a walking beam and more particularly its driving mechanisms whereby a material placed on a plurality of stationary beams for transfer, e.g., a steel product such as a steel pipe or round bar is raised from below, moved forward and lowered again onto the stationary beams by a plurality of transfer beams and this process is repeated to effect the transfer of the material. Each of the driving mechanisms includes a first link for causing the transfer beam to make a circular motion and the first link is rotatable about a supporting shaft with a radius of rotation l. The supporting shaft is fitted in the forward end of a second link and is rotatable about a main rotating shaft with a radius of rotation 2l. Mounted also on the supporting shaft is a first gear which is rotatable along with the first link and the first gear is in mesh with a second gear mounted on the main rotating shaft. The driving of the second gear and the second link is controlled selectively such that one of them is driven and the other is locked or both of them are driven and in this way the feed length of the transfer stroke of the transfer beam is changed to 2l, 4l or 6l.

3 Claims, 12 Drawing Figures

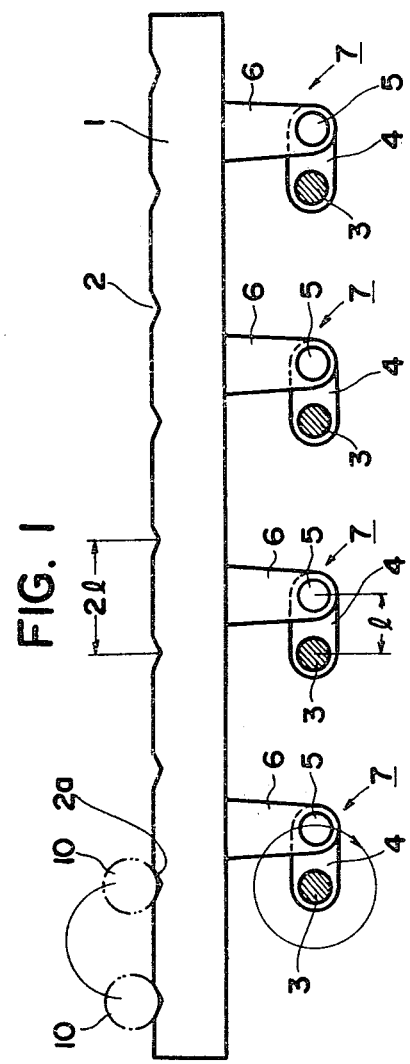
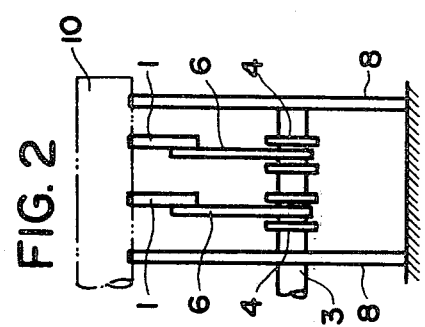

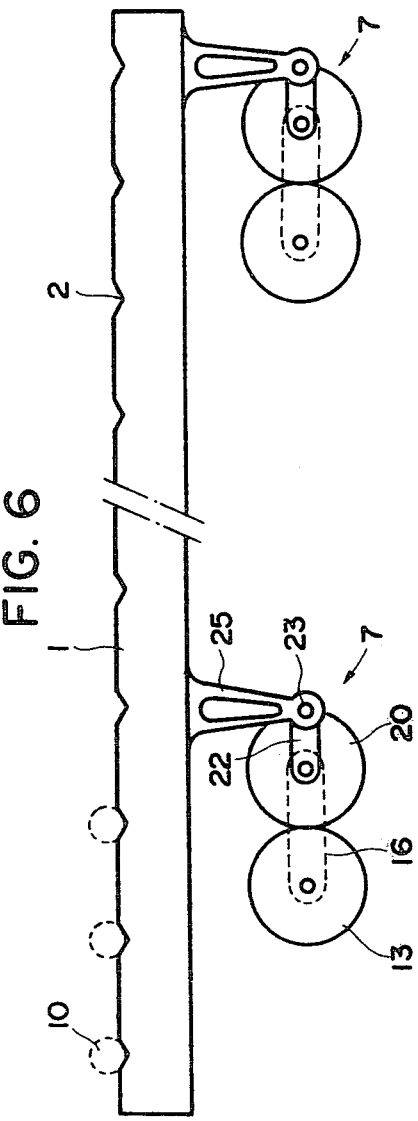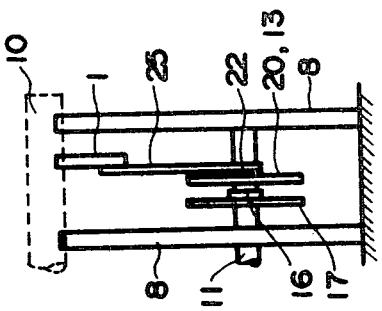

WALKING BEAM

BACKGROUND OF THE INVENTION

The present invention relates to improvements in and relating to a walking beam of the type used in the manufacturing and processing lines of steel pipe, round bars or the like for transferring the material.

Where various kinds of steel products such as steel pipes or round bars are to be transferred transversely, particularly in a hot line such as a heating furnace where the occurrence of defects, e.g., scoring must be avoided, a walking beam is used for transversally transferring steel products. This walking beam comprises a plurality of stationary beams and a plurality of transfer beams which are arranged parallel to one another and the transfer beams are caused to make a circular motion by means of link mechanisms in a manner that a steel product placed on the stationary beams is raised from below, moved forward and placed again on the stationary beams by the transfer beams and this process is repeated by the circular motion of the transfer beams to effect the transversal transfer of the steel material. In the case of an ordinary walking beam, a plurality of transfer beams are caused to make a circular motion vertically with a predetermined radius and this radius of circular motion determines the feed length of the steel product transfer stroke. Usually, when it is desired to change the feed length of the transfer stroke, it is necessary to rearrange the link mechanisms which cause the transfer beams to make a circular motion and this not only involves complicated operations for rearranging purposes but also a disadvantage of making it necessary to stop the transfer line during the period of rearrangement.

In the case of a walking beam of the type in which its transfer beams are driven by hydraulic mechanisms, while the transfer length can be varied by varying the stroke of the hydraulic cylinders, there are many disadvantages that it is difficult to stop accurately the hydraulic cylinders in the middle of their strokes, that the transfer speed is limited by the speed of the hydraulic cylinders making the walking beam unfit for high-speed transferring purposes and so on.

SUMMARY OF THE INVENTION

It is a principal object of the present invention to provide an improved walking beam so designed that its feed length can be varied without the need to rearrange its driving mechanisms which cause its transfer beams to make a ciucular motion.

It is another object of the present invention to provide an improved walking beam so designed that the feed length of the transfer stroke by its transfer beams can be varied to any one of three different feed lengths having ratios of 1:2:3.

Thus, in accordance with one form of the present invention there is provided a walking beam of the type in which a material placed on stationary beams for transfer is transferred by repeating the process of raising the material from below, moving the material forward and placing the material again on the stationary beams by means of transfer beams caused to make a circular motion in response to the rotation of driving rotating shafts and the walking beam further includes driving mechanisms each comprising a first link rotatably mounted on a supporting shaft to cause one of the transfer beams to make a circular motion, a second link having the supporting shaft fitted in its forward end and rotatable about a main rotating shaft with a radius of rotation which is two times that of the first link, a first gear mounted on the supporting shaft to rotate along with the first link and a second gear mounted on the main rotating shaft and in mesh with the first gear, whereby the second link, the second gear and both of them are selectively rotated by the driving rotating shafts so as to change the radius of rotation of the transfer beam circular motion to any one of three radiuses having ratios of 1:2:3 and thereby to change the feed length similarly to any one of three different feed lengths.

The first and second gears should preferably be comprised of spur gears having the same pitch circle and the same diameter whereby the transfer beam makes a circular motion with the radius of rotation l of the first link when the second link is locked and only the first link is rotated, with the radius of rotation 2l of the second link when the first gear is prevented from rotating on its own axis but is moved around the main rotating shaft by the second link and with the sum 3l of the radiuses of rotation of the two when the second link and the second gear are rotated together simultaneously.

The first gear is a so-called planet gear and the second gear is a so-called sun gear. In the walking beam of this invention, the transfer beams are each driven by combinations of "the double link structures" and "the planet-sun gear structures" which are described above, with the result that the feed length of the transfer stroke can be easily changed to any one of the three feed lengths having the ratios of 1:2:3 without requiring any rearranging operation of the driving mechanisms but by simply suitably driving the gears selectively through a known type of clutch or gear changing system.

BRIEF DESCRIPTION OF THE DRAWINGS

FIG. 1 is a schematic side view of the transfer beam unit of a conventional walking beam, which is useful for explaining its principle of operation.

FIG. 2 is a schematic partial front view of the walking beam shown in FIG. 1.

FIG. 6 is a schematic side view of the transfer beam unit in the walking beam according to the embodiment of the invention, which is useful for explaining its principle of operation.

FIG. 7 is a partial front view of the walking beam according to the embodiment of the invention.

DESCRIPTION OF THE PREFERRED EMBODIMENTS

Figure 3A:
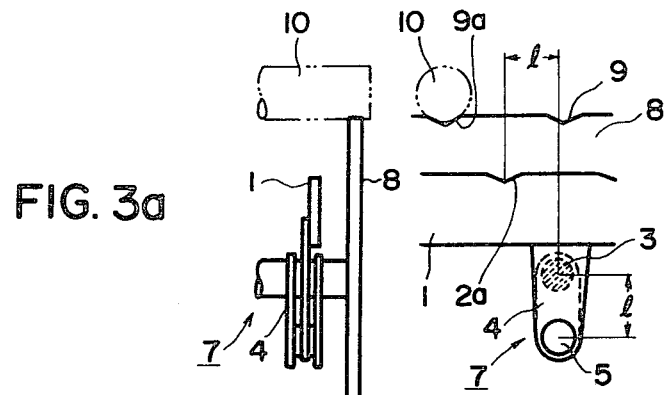
FIGS. 3a, 3b and 3c are diagrams useful for explaining the operation of the walking beam of FIG. 1.

The construction and operation of the conventional walking beam will now be described first with reference to FIGS. 1, 2, 3a, 3b and 3c. In the Figures, numeral 1 designates solid structure transfer beams of 20 to 30 m long, for example, and 2 notches formed at equal spaces in the upper surface of each of the transfer beams 1 so that a steel pipe P to be transferred can be stably deposited on the transfer beam 1. Numeral 3 designates main shafts driven by a motor (not shown), and 4 links fixedly mounted on the main shafts 3, and 5 fixed shafts fixedly fitted in the forward ends of the links 4. Each of arms 6 has its one end fixedly mounted on one of the transfer beams 1 and its other end rotatably mounted on one of the fixed shafts 5. These elements form driving mechanisms 7 for the transfer beams 1. The spacing between the notches 2 formed on the transfer beams 1 is selected about two times the distance l between the main shaft 3 and the fixed shaft 5 or 2l. Numeral 8 designates stationary beams vertically mounted in place and having notches 9 formed in their upper surfaces at positions corresponding to the notches 2 on the transfer beams 1. The stationary beams 8 and the transfer beams 1 are arranged parallel to one another as shown in FIG. 2.

With the construction described above, the operation of the walking beam will now be described with reference to FIGS. 1, 2 and 3a to 3c.

Figure 3B:
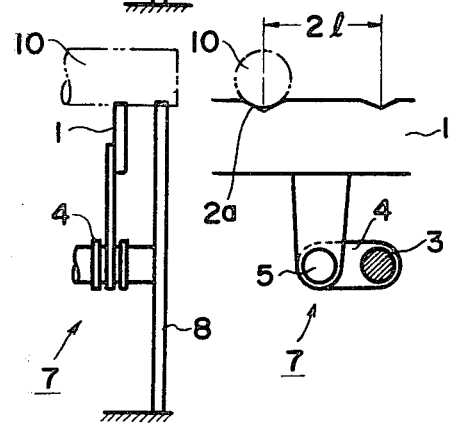
Figure 3C:
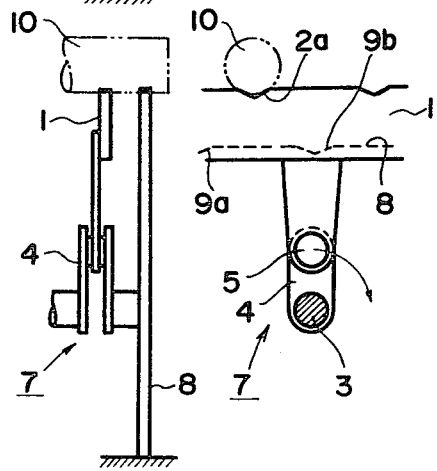

Initially, in the condition of FIG. 1 the fixed shafts 5 of the driving mechanisms 7 are at the horizontal positions to the right of the main shafts 3 so that the upper surfaces of the transfer beams 1 and the stationary beams 8 are substantially in the same plane as shown in FIG. 2 and one of the notches 2 is just above one of the main shafts 3. FIG. 3a shows the conditions attained when the main shafts 3 are rotated $\pi/4$ radians in a clockwise direction so that the fixed shafts 5 connected to the links 4 are brought into their lowered positions. At this time, the transfer beams 1 are brought into their lowermost positions and the notches 2a are each displaced to the left by the distance l from the position of FIG. 1. When the main shafts 3 are rotated further by $\pi/4$ radians in the clockwise direction, as shown in FIG. 3b, the fixed shafts 5 are brought to the horizontal positions to the left of the main shafts 3 and the transfer beams 1 are raised. As a result, the transfer beams 1 are arranged practically in the same plane with the stationary beams 8 and each of the notches 2a is displaced to the left by the distance 2l from the original position to face one of the notches 9 on the stationary beams 8. When the main shafts 3 are further rotated in the clockwise direction, the steel pipe 10 placed in the notches 9a of the stationary beams 8 is transferred into the notches 2a of the transfer beams 1. When each of the main shafts 3 is rotated $\pi/4$ radians from the position of FIG. 3b, as shown in FIG. 3c, each of the transfer beams 1 is moved into the uppermost position and each of the notches 2a receiving the steel pipe 10 is displaced to the right by the distance l from the position of FIG. 3b. When the main shafts 3 are rotated further by $\pi/4$ radians in the clockwise direction, the main shafts 3 are returned to the conditions of FIG. 1 and the steel pipe 10 is transferred into the notches 9 of the stationary beams 8. In other words, the steel pipe 10 is moved in a step-wise manner by the distance 2l for every rotation of the main shafts 3 and in this way the steel pipe 10 is successively transferred to the right in FIG. 1.

With the walking beam constructed as described above, while the steel pipe 10 is always transferred with the feed length of 2l, cases frequently occur where it is desirable to transfer material by varying the feed length. In such a case, the walking beam of the type designed to drive the driving mechanisms 7 by the motor is disadvantageous in that the driving mechanisms 7 must be replaced with those of the desired feed length and this operation is extremely troublesome.

The present invention has been made with a view to overcoming the foregoing difficulty in the prior art and it provides a walking beam employing improved driving mechanisms and thus capable of easily varying the feed length at any one of three ratios 1:1, 1:2 and 1:3. The present invention will now be described in greater detail with reference to the drawings.

Figure 4:
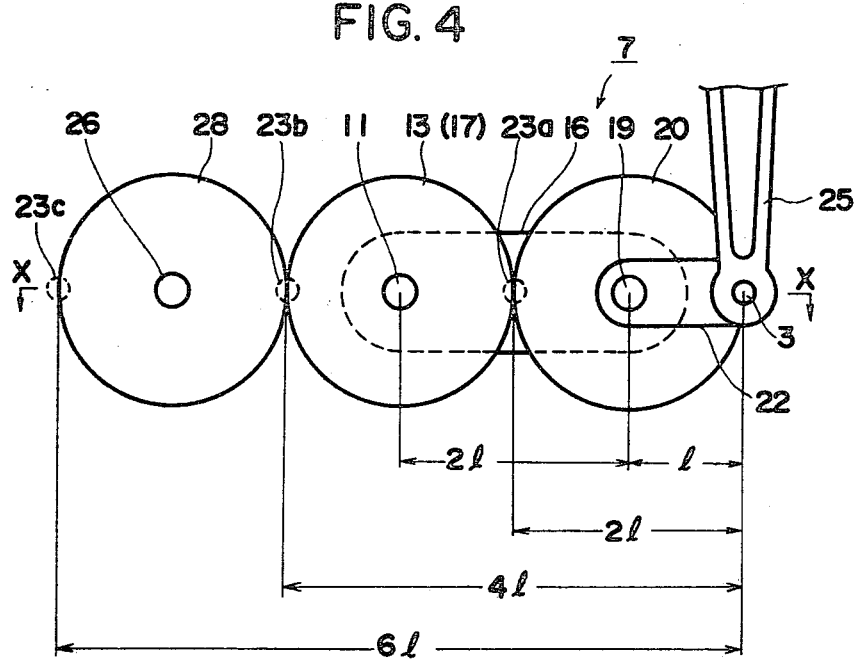
FIG. 4 is a schematic diagram showing the construction of the driving mechanisms used in a walking beam according to an embodiment of the invention.
Figure 5:
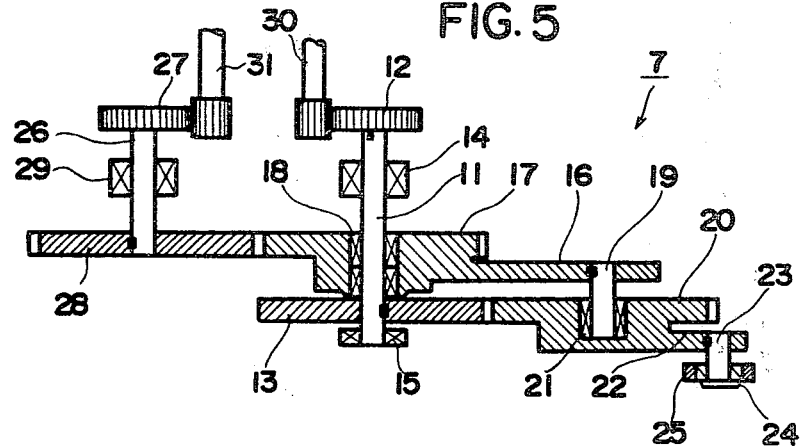
FIG. 5 is a view looked in the direction of the arrowed line X—X of FIG. 4.

FIG. 4 is a schematic diagram of an embodiment of driving mechanisms forming an important feature of the invention, and FIG. 5 is a sectional view taken along the line X—X of FIG. 4. In the Figures, numeral 11 designates a main rotating shaft connected via a gear 12 to a first driving rotating shaft 30 connected to the output shaft of a motor (not shown) and driven thereby and the main rotating shaft 11 is supported by bearings 14 and 15. Numeral 25 designates an arm fixedly mounted on the transfer beam 1 and corresponding to the arm 6 in FIG. 1. The end of the arm 25 is rotatably mounted on a fixed shaft 23 by means of a bearing 24. The fixed shaft 23 is firmly fitted in the forward end of a first link 22. The first link 22 is made integral with a first gear 20 and they are rotatably mounted on a supporting shaft 19 by means of a bearing 21. The radius of rotation of the first link 22 is l as in the previously mentioned case of FIG. 1 and the pitch radius of the first gear 20 is also selected equal to the l. The supporting shaft 19 is firmly fitted in the forward end of a second link 16 which in turn is rotatably mounted on the main rotating shaft 11 by a bearing 18 in such a manner that its radius of rotation becomes 2l. Also mounted on the main rotating shaft 11 is a second gear 13 which in the illustrated case is rotatable along with the main rotating shaft 11. The pitch radius of the second gear 13 is also selected equal to the l and the first and second gears 20 and 13 are in mesh as will be seen from FIG. 5 so that the second gear 13 forms a sun gear and the first gear 20 forms a planet gear.

Numeral 17 designates a third gear which is made integral with the second link 16 and which is also mounted on the main rotating shaft 11 by means of the bearing 18. Its pitch radius is also selected equal to the l.

Numeral 26 designates an intermediate rotating shaft supported by a bearing 29 and having a fourth gear 28 fixedly mounted on one end and another gear 27 fixedly mounted on the other end. The fourth gear 28 has the same pitch radius as the l and is in mesh with the third gear 17.

The intermediate rotating shaft 26 is connected to a driving rotating shaft 31 by the gear 27 mounted on the other end of the shaft 26 so that it rotates the fourth gear 28 in response to the rotation of the driving rotating shaft 31.

In accordance with the walking beam of this invention including the driving mechanisms constructed as described above, the below-mentioned first, second or third operating condition can be selected by selectively operating such that one of the first and second driving rotating shafts 30 and 31 is locked and only the other is rotated or both of them are rotated simultaneously in a predetermined relation.

THE FIRST OPERATING CONDITION

The second driving rotating shaft 31 is locked to lock the second link 16 and then the main rotating shaft 11 is rotated by the first driving rotating shaft 30 so that the second gear 13 is rotated in a counter-clockwise direction and the first gear 20 engaging with the second gear 13 is rotated in a clockwise rotation. When the second gear 13 makes one rotation, the first gear 20 makes one rotation about the supporting shaft 19 and the fixed shaft 23 rotates through a position 23a and returns to the original position in FIG. 4. In other words, the fixed shaft 23 can be displaced by an amount corresponding to the feed length 2l as shown in FIG. 4.

THE SECOND OPERATING CONDITION

The second link 16 is rotated in the clockwise direction by the second driving rotating shaft 31 via the gears 28 and 17. On the other hand, the first driving rotating shaft 30 is locked and the second gear 13 is also locked. As a result, the first gear 20 is rotated in the counterclockwise direction relative to the supporting shaft 19 and this counterclockwise relative rotation is made once for every clockwise rotation of the second link 16. In other words, as a result of the resultant motion, the first gear 20 apparently does not rotates on its own axis but is rotated about the second gear 13. As a result, when the second link 16 is rotated $\pi/2$ radians in the clockwise direction in FIG. 4, the first gear 20 does not rotate on its own axis but is rotated by $\pi/2$ radians about the second gear 13, with the result that the fixed shaft 23 on the first link 22 is brought to a position 23b in FIG. 4 and the fixed shaft 23 is returned to the original position when the second link 16 is further rotated by $\pi/2$ radians in the clockwise direction. In other words, the fixed shaft 23 can be displaced by an amount corresponding to the feed length 4l as shown in FIG. 4.

THE THIRD OPERATING CONDITION

The second link 16 is rotated in the clockwise direction by the second driving rotating shaft 31 via the gears 28 and 17 and simultaneously the second gear 13 is also rotated by the first driving rotating shaft 30 in the same direction and at the same speed as the third gear 17. In other words, the second link 16 and the second gear 13 are rotated simultaneously in the clockwise direction as if they form a unit. As a result, the first link 22 no longer rotates relative to the supporting shaft 19 so that if this is done in the condition where the first and second links 22 and 16 are extended straightly as shown in FIGS. 4 and 5, the fixed shaft 23 rotates about the main rotating shaft 11 with a radius of rotation 3l. In other words, when the second link 16 is rotated $\pi/2$ radians, the fixed shaft 23 is brought to a position 23c in FIG. 4 and in this case the fixed shaft 23 can be displaced by an amount corresponding to the feed length 6l as shown in FIG. 4.

FIG. 6 is a side view of the transfer beam unit in the embodiment of the invention, FIG. 7 is a front view of FIG. 6 and FIGS. 8a to 8c are diagrams useful for explaining the operation of the embodiment.

Figure 8A:
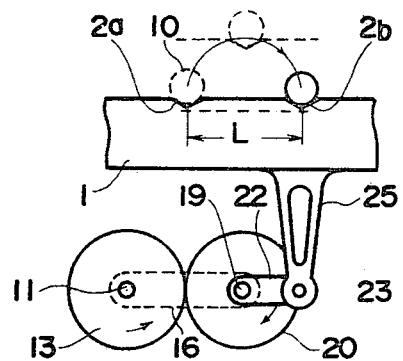
FIGS. 8a, 8b and 8c are diagrams useful for explaining the operation of the walking beam according to the present invention.

FIG. 8a shows a case where a material is transferred over a distance L=2l. Thus, as described in connection with the first operating condition, if the second link 16 is locked and the first gear 20 is rotated in the clockwise direction by the second gear 13, the transfer beam 1 is caused to make a circular motion vertically and laterally in the Figure by means of the first gear 20, the first link 22 and the arm 25 and a steel pipe 10 placed in a notch 2a is transferred to a notch 2b, thus moving the steel pipe 10 forward by L=2l.

Figure 8B:
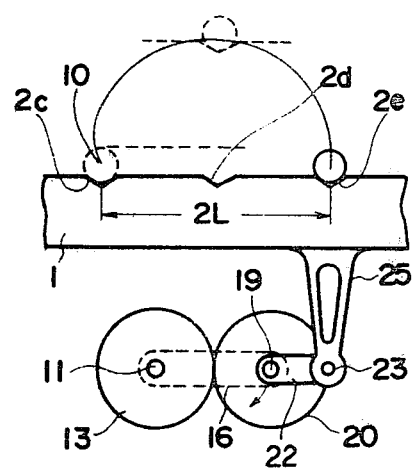

FIG. 8b shows a case where the steel pipe 10 is transferred over a distance 2L=4l. Thus, as described in connection with the second operating condition, with the second gear 13 being locked, the second link 16 is rotated and the first gear 20 is apparently prevented from rotating on its own axis but is rotated about the second gear 13. As a result, the transfer beam 1 is caused to make a circular motion vertically and laterally in the Figure by means of the first gear 20, the first link 22 and the arm 25, so that a notch 2c is displaced with a path as shown in the Figure and the steel pipe 10 in the notch 2c is transferred into a notch 2e skipping a notch 2d, thus moving the steel pipe 10 forward by 2L=4l.

Figure 8C:
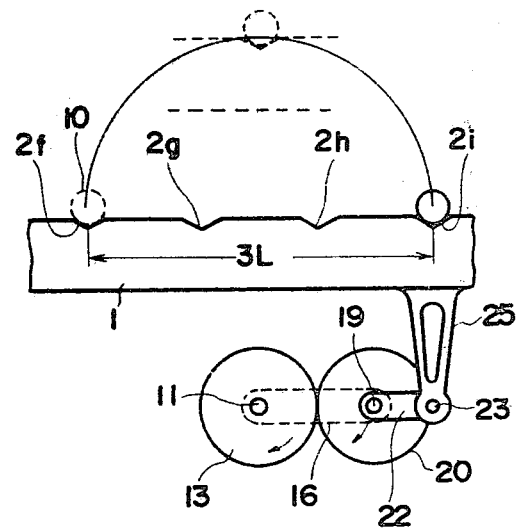

FIG. 8c shows a case where the steel pipe 10 is transferred over a distance 3L=6l. Thus, as described in connection with the third operating condition, if the first gear 20 is prevented from rotating relative to the supporting shaft 19 and the second link 16 is rotated in the clockwise direction, the first gear 20 is driven by the second link 16 and the first gear 20 is rotated about the second gear 13 as in the case of the moon moving around the earth. As a result, the transfer beam 1 is displaced vertically and laterally so that the steel pipe 10 in a notch 2f is transferred into a notch 2i skipping notches 2g and 2h, thus moving the steel pipe 10 forward by the distance 3L=6l.

In this way, by suitably locking or rotating the sun gears, the double links and the planet gears, it is possible to change the feed length to L, 2L or 3L or at a ratio of 1:1, 1:2 or 1:3.

While, in the above description, the means required for locking the gears and the links are not described in any detail, these means may for example be based on the locking and driving means used with the ordinary planetary gearing. Further, while the first to fourth gears have the same pitch radius, it is possible to use first to fourth gears having different pitch radiuses and in this case it is only necessary to suitably select their speed ratios.

What is claimed is:

1. In a walking beam wherein a material to be transferred is placed on a plurality of stationary beams and the material is transferred by repeating a process of raising the material from below, moving the material forward and placing the material again on the stationary beams by a plurality of transfer beams adapted to make a circular motion in response to the rotation of driving rotating shaft means, the improvement wherein each of said transfer beams is provided with a plurality of driving means responsive to the rotation of said driving rotating shaft means to cause said transfer beam to make a circular motion, each of said driving means comprising:

a first link having one end thereof connected to said transfer beam to cause said circular motion of said transfer beam and other end thereof mounted on a supporting shaft to rotate about the same;

a second link mounted on a main rotating shaft to rotate about the same and having a radius of rotation two times that of said first link, the other end of said supporting shaft being fitted in a forward end of said second link;

a first gear mounted on said supporting shaft to rotate together with said first link; and a second gear mounted on said main rotating shaft and in mesh with said first gear, whereby varying a feed length of said material at a ratio of 1:1, 1:2 and 1:3, respectively, in response to a first operating condition where said second link is locked and only said first link is rotated about said supporting shaft by said second gear through said first gear, a second operating condition where said first gear is prevented from rotating on its own axis but is moved about said main rotating shaft by said second link, and a third operating condition where said second link is rotated about said main rotating shaft and said first link is rotated about said supporting shaft in a direction opposite to the direction of rotation of said second link once for every rotation of said second link.

2. A walking beam according to claim 1, wherein each of said first and second gears is a spur gear having a pitch circule with a radius equal to the radius of rotation of said first link.

3. A walking beam according to claim 1, further comprising first driving rotating shaft means for driving said second gears and second driving rotating shaft means for rotating said second links.

* * * * *